United States Patent
Kim et al.

(10) Patent No.: US 9,127,432 B2
(45) Date of Patent: Sep. 8, 2015

(54) COMPLEX ELECTROKINETIC DECONTAMINATION EQUIPMENT FOR DECONTAMINATING RADIONUCLIDE AND DECONTAMINATION METHOD USING THE SAME

(75) Inventors: Gye Nam Kim, Daejeon (KR); Jei Kwon Moon, Daejeon (KR); Ki Won Lee, Daejeon (KR); Dong Bin Shon, Daejeon (KR); Hye Min Park, Seoul (KR)

(73) Assignee: Korea Atomic Energy Research Institute, Daejeon (KR)

( * ) Notice: Subject to any disclaimer, the term of this patent is extended or adjusted under 35 U.S.C. 154(b) by 334 days.

(21) Appl. No.: 13/326,582

(22) Filed: Dec. 15, 2011

(65) Prior Publication Data
US 2012/0325663 A1 Dec. 27, 2012

(30) Foreign Application Priority Data

Jun. 21, 2011 (KR) .................. 10-2011-0060156
Aug. 17, 2011 (KR) .................. 10-2011-0081501

(51) Int. Cl.
| | |
|---|---|
| *B09C 1/08* | (2006.01) |
| *B09C 1/02* | (2006.01) |
| *E02D 31/00* | (2006.01) |
| *C02F 101/00* | (2006.01) |

(52) U.S. Cl.
CPC .............. *E02D 31/002* (2013.01); *B09C 1/02* (2013.01); *B09C 1/085* (2013.01); *B09C 2101/00* (2013.01); *C02F 2101/006* (2013.01)

(58) Field of Classification Search
CPC ...... B09C 1/085; B09C 1/02; C02F 2101/006
See application file for complete search history.

(56) References Cited

U.S. PATENT DOCUMENTS

| | | | | |
|---|---|---|---|---|
| 2,788,295 | A | * | 4/1957 | Cooke et al. .................. 428/87 |
| 5,342,449 | A | * | 8/1994 | Holbein et al. .................. 134/2 |
| 5,391,018 | A | * | 2/1995 | Parker .................. 405/128.85 |
| 5,614,077 | A | * | 3/1997 | Wittle et al. .................. 205/704 |

(Continued)

FOREIGN PATENT DOCUMENTS

| | | |
|---|---|---|
| JP | 11-005077 | 1/1999 |
| JP | 11511808 | 10/1999 |

(Continued)

OTHER PUBLICATIONS

PCT/KR2011/006861; PCT International Search Report dated May 30, 2012.

(Continued)

*Primary Examiner* — Keith Hendricks
*Assistant Examiner* — Salil Jain
(74) *Attorney, Agent, or Firm* — Renner, Otto, Boisselle & Sklar, LLP (57) ABSTRACT

A complex electrokinetic decontamination equipment is disclosed, which removes a radionuclide from contaminated soil with a high efficiency, using a combination of a washing decontamination method performed in an electrokinetic unit using electrolyte and an electrokinetic decontamination method performed by the electrokinetic unit. pH values in an anode chamber and a cathode chamber are optimally controlled by a pH control unit, thereby reducing quantity and size of metal oxide particles. In addition, a water level of the electrolyte in the electrokinetic unit may be automatically controlled by an electrolyte supply controller.

20 Claims, 6 Drawing Sheets

(56) References Cited

U.S. PATENT DOCUMENTS

| | | | |
|---|---|---|---|
| 5,816,742 A * | 10/1998 | Cordewener | 405/43 |
| 5,894,077 A * | 4/1999 | Jones et al. | 588/20 |
| 6,979,116 B2 * | 12/2005 | Cecala et al. | 366/132 |
| 7,662,217 B2 * | 2/2010 | O'Brien et al. | 95/275 |
| 8,430,598 B2 * | 4/2013 | Kim et al. | 405/128.75 |
| 2008/0128293 A1 * | 6/2008 | Mohanta et al. | 205/770 |

FOREIGN PATENT DOCUMENTS

| | | |
|---|---|---|
| JP | 2000-140819 | 5/2000 |
| JP | 2001-340841 | 12/2001 |
| JP | 2002-273404 | 9/2002 |
| JP | 2003-260458 | 9/2003 |
| KR | 1020030029204 | 4/2003 |
| KR | 1020030043126 | 6/2003 |
| KR | 1020040015855 | 2/2004 |
| KR | 1020090054087 | 5/2009 |
| KR | 1020090121840 | 11/2009 |

OTHER PUBLICATIONS

Official Action for the corresponding Japanese Patent Application No. 2011-282018 dated Aug. 6, 2013.

* cited by examiner

COMPLEX ELECTROKINETIC DECONTAMINATION EQUIPMENT FOR DECONTAMINATING RADIONUCLIDE AND DECONTAMINATION METHOD USING THE SAME

CROSS-REFERENCE TO RELATED APPLICATIONS

This application claims the benefit of Korean Patent Application No. 10-2011-0060156 and of Korean Patent Application No. 10-2011-0081501, respectively filed on Jun. 21, 2011 and Aug. 17, 2011, in the Korean Intellectual Property Office, the disclosures of which are incorporated herein by reference.

BACKGROUND

1. Field of the Invention

The present invention relates to complex electrokinetic decontamination, and more particularly, to a complex electrokinetic decontamination equipment for processing soil contaminated by a radionuclide with high decontamination efficiency while considerably reducing waste solution generated during the decontamination process, and a decontamination method using the same.

2. Description of the Related Art

Generally, a great quantity of radioactive soil is generated from operating and dismantling of a nuclear facility. In particular, in a case of an unexpected accident occurring at the nuclear facility for various reasons such as negligent management or a natural disaster, surrounding soil may be contaminated by a radionuclide discharged from the nuclear generation facility.

Accordingly, in recent days, a soil decontamination technology to achieve self disposal of the radioactive soil is being developed to reduce generation of radioactive waste or quickly restore the radionuclide-contaminated soil.

The soil decontamination technology reduces a concentration of radioactivity of the soil. Conventionally, for this purpose, a soil washing method has been used. However, the conventional method is unsatisfactory in terms of decontamination efficiency while causing a great quantity of waste solution.

Accordingly, there is a desire for a new decontamination scheme capable of increasing the decontamination efficiency for soil contaminated by a radionuclide while, at the same time, considerably reducing a quantity of a waste solution generated by decontamination.

SUMMARY

An aspect of the present invention provides a complex electrokinetic decontamination equipment increased in efficiency for decontamination of soil contaminated by a radionuclide, using a combination of a washing decontamination method and an decontamination method using the same.

Another aspect of the present invention provides a complex electrokinetic decontamination equipment that considerably reduces a quantity of a waste solution generated during the decontamination of the soil by recycling the waste solution, and a decontamination method using the same.

Still another aspect of the present invention provides a complex electrokinetic decontamination equipment that secures operational stability and reliability by automatically controlling conditions for soil decontamination, and a decontamination method using the same.

According to an aspect of the present invention, there is provided a complex electrokinetic decontamination equipment for removing a radionuclide from contaminated soil.

The complex electrokinetic decontamination equipment may include an electrolyte supply unit to supply an electrolyte, an electrokinetic unit comprising an inlet disposed at one side and connected with the electrolyte supply unit to be supplied with the electrolyte from the electrolyte supply unit, a receiving portion disposed on an inside to receive the contaminated soil, and an outlet disposed at another side to discharge waste electrolyte passed through the contaminated soil to the outside, an electrode unit provided to the electrokinetic unit to supply an anode power and a cathode power to different portions of the contaminated soil received in the receiving portion, and a pH control unit provided to the electrokinetic unit to supply a pH control solution to the portions supplied with the anode power and the cathode power so as to control pH values of the portions.

According to the complex electrokinetic decontamination equipment, the radionuclide in the contaminated soil may be removed by a washing decontamination method using the electrolyte supplied by the electrolyte supply unit. Simultaneously, the radionuclide may also be removed by an electrokinetic decontamination method using the anode power and the cathode power supplied by the electrode unit. Accordingly, the decontamination may be performed with an increased efficiency and at a reduced time.

The complex electrokinetic decontamination equipment may remove cesium (Cs), uranium (Ur), and cobalt (Co) from the contaminated soil.

Furthermore, optimal pH values of portions supplied with the anode power and the cathode power may be maintained by a pH control solution supplied by the pH control unit. Therefore, a quantity of metal oxide particles generated during the electrokinetic decontamination may be reduced. Also, generation of a waste solution may be reduced.

The pH control unit may include an anode pH controller to control a pH value of a portion supplied with the anode power to a first preset value by supplying the pH control solution to the portion supplied with the anode power, and a cathode pH controller to control a pH value of a portion supplied with the cathode power to a second preset value by supplying the pH control solution to the portion supplied with the cathode power.

The first preset value may be within a range of 0.5 pH to 1.5 pH. The second preset value may also be within a range of 0.5 pH to 1.5 pH. The pH control solution may be a nitric acid solution.

The receiving portion of the electrokinetic unit may include a receiving chamber configured to receive the contaminated soil, an anode chamber disposed between the receiving chamber and the inlet, and a cathode chamber disposed between the receiving chamber and the outlet.

The electrode unit may include an anode electrode disposed in the anode chamber, a cathode electrode disposed in the cathode chamber, and a power supply to supply the anode power and the cathode power respectively to the anode electrode and the cathode electrode.

The pH control unit may include an anode pH controller to control a pH value in the anode chamber to a first preset value by supplying the pH control solution to the anode chamber, and a cathode pH controller to control a pH value in the cathode chamber to a second preset value by supplying the pH control solution to the cathode chamber.

The anode pH controller may include an anode chamber pH sensor disposed in the anode chamber, and an anode chamber solution supplier to supply the pH control solution into the anode chamber according to a detection value of the anode chamber pH sensor.

The cathode pH controller may include a cathode chamber pH sensor disposed in the cathode chamber, and a cathode chamber solution supplier to supply the pH control solution into the cathode chamber according to a detection value of the cathode chamber pH sensor.

According to another embodiment, the pH control unit may include an anode chamber pH sensor disposed in the anode chamber, a cathode chamber pH sensor disposed in the cathode chamber, and a solution supplier to supply the pH control solution to at least one of the anode chamber and the cathode chamber according to detection values of the anode chamber pH sensor and the cathode chamber pH sensor. That is, the pH values in the anode chamber and the cathode chamber may be selectively controlled using a single solution supplier.

The complex electrokinetic decontamination equipment may further include a waste solution processing unit connected to the outlet of the electrokinetic unit to remove metal oxide particles generated around the cathode power in the electrokinetic unit by processing waste solution discharged through the outlet. That is, since the waste electrolyte discharged from the electrokinetic unit is processed by the waste solution processing unit, a quantity of the waste solution discharged may be reduced.

The waste solution processing unit may include a waste solution circulator disposed between the outlet of the electrokinetic unit and the electrolyte supply unit to circulate the waste solution being discharged through the outlet to the electrolyte supply unit, and a metal oxide separator connected in fluid communication with the waste solution circulator to remove the metal oxide particles from the waste solution being circulated by the waste solution circulator. That is, the metal oxide separator may remove the metal oxide particles from the waste electrolyte, thereby recycling the waste electrolyte into the electrolyte. The electrolyte recycled by the metal oxide separator may be collected to the electrolyte supply unit by the waste solution circulator. Thus, since all of the waste solution generated from the complex electrokinetic decontamination equipment is reused, troubles occurring due to the waste solution may be solved.

The waste solution circulator may include a circulation path connected in fluid communication with the cathode chamber and the electrolyte supply unit, and a circulation pump disposed on the circulation path.

The metal oxide separator may include a detachable filter member to filter the metal oxide particles from the waste electrolyte.

The complex electrokinetic decontamination equipment may further include a waste solution storage unit connected to the outlet of the electrokinetic unit to store the waste electrolyte being discharged through the outlet, a soil washing unit connected to the waste solution storage unit to reduce a content of the radionuclide included in the contaminated soil to be supplied to the electrokinetic unit, using the waste electrolyte supplied from the waste solution storage unit, a settling separation unit connected to the soil washing unit to separate waste wash solution discharged from the soil washing unit into a precipitate and a supernatant, and a waste solution processing unit connected to the settling separation unit to process the precipitate separated by the settling separation unit.

That is, since the contaminated soil is pre-processed in the washing decontamination method using the soil washing unit, a decontamination load at the electrokinetic unit may be greatly reduced while the efficiency of decontamination is increased. Actually, about 70% to 80% of the radionuclide in the contaminated soil may be removed by during the pre-processing performed by the soil washing unit. Furthermore, about 95%, or more, of the radionuclide remaining in the pre-processed contaminated soil may be removed by decontamination operation of the electrokinetic unit and the electrode unit.

Moreover, the metal oxide particles are efficiently removed from the waste wash solution using the settling separation unit and the waste solution processing unit. Therefore, the waste wash solution may be easily recycled to the electrolyte. As the electrolyte is repeatedly recycled, troubles occurring due to the waste solution may be reduced.

The waste electrolyte and the waste wash solution may include metal oxide particles generated around the cathode power in the electrokinetic unit. The precipitate may include the metal oxide particles settling at a lower portion of the settling separation unit. The supernatant may include the electrolyte separated from the metal oxide particles and disposed at an upper portion of the settling separation unit.

The settling separation unit may circulate the supernatant to the electrolyte supply unit while discharging the waste wash solution including the precipitate to the waste solution processing unit.

The complex electrokinetic decontamination equipment may further include a concentration unit disposed between the settling separation unit and the waste solution processing unit to concentrate the waste wash solution being discharged from the settling separation unit.

The waste solution processing unit may include a detachable filter member to filter the metal oxide particles from the waste wash solution. The waste solution processing unit may circulate, to the electrolyte supply unit, the electrolyte from which the metal oxide particles are separated by the filter member.

The electrolyte supply unit may be disposed at a higher position than the inlet of the electrokinetic unit so that the electrolyte is automatically supplied to the receiving portion by a head difference of the electrolyte. The electrokinetic unit may include an electrolyte supply controller to control a quantity of the electrolyte supplied so that a water level of the electrolyte in the receiving portion is constantly maintained.

The electrolyte supply controller may include a water level sensor disposed in the electrokinetic unit to detect the water level of the electrolyte in the receiving portion, and a valve openably disposed at the inlet to selectively open or close the inlet according to a detection value of the water level sensor.

The electrokinetic unit and the electrode unit may be plural in number. At least one of the electrolyte supply unit and the pH control unit may be connected to the electrokinetic unit in parallel. By increasing the number of the electrokinetic unit and the electrode unit, capacity of the complex electrokinetic decontamination equipment may be simply increased.

According to another aspect of the present invention, there is provided a complex electrokinetic decontamination method including washing contaminated soil to reduce radionuclide included in the contaminated soil, putting the washed contaminated soil in an electrokinetic unit, supplying an electrolyte to the contaminated soil received in the electrokinetic unit, supplying an anode power and a cathode power to different portions of the contaminated soil to electrokinetic-decontaminate the contaminated soil, supplying a pH control solution to the portions supplied with the anode power and the cathode power so as to control pH values of the portions, and processing a waste solution generated during the electorokinetic decontamination of the contaminated soil.

Effect

According to embodiments of the present invention, a complex electrokinetic decontamination equipment and method adopt both a wash decontamination method using an electrolyte and an electrokinetic decontamination method using an electrode unit, in a combined manner. Therefore, a radionuclide may be efficiently removed from contaminated soil. That is, decontamination efficiency of the complex electrokinetic decontamination equipment may be maximized.

Additionally, according to embodiments of the present invention, a complex electrokinetic decontamination equipment and method remove metal oxide particles from a waste electrolyte, using at least one of a settling separation unit and a waste solution processing unit. Therefore, the waste solution generated during decontamination of contaminated soil may be recycled to an electrolyte and reused for decontamination. Consequently, a quantity of the waste solution generated during the decontamination may be considerably reduced.

According to embodiments of the present invention, a complex electrokinetic decontamination equipment and method control pH values of portions corresponding to a cathode power and an anode power supplied by an electrode unit, to preset values using a pH control unit. Accordingly, metal oxide particles generated during decontamination of contaminated soil may be reduced. In addition, heating and clogging caused as the metal oxide particles increase may be prevented.

According to embodiments of the present invention, a complex electrokinetic decontamination equipment and method may automatically control a supplied quantity of the electrolyte according to a water level of the electrolyte present in an electrokinetic unit, using an electrolyte supply controller. Therefore, a water level of the electrolyte in the electrokinetic unit may be maintained constantly. Also, shortage of the electrolyte may be prevented.

In addition, according to embodiments of the present invention, a complex electrokinetic decontamination equipment and method may include a large-capacity soil washing unit of about 3,000 liters (L). Also, an electrokinetic unit, an electrode unit, and a pH control unit may be manufactured in a large capacity of about 520 L. That is, large size and capacity of the complex electrokinetic decontamination equipment may be achieved.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
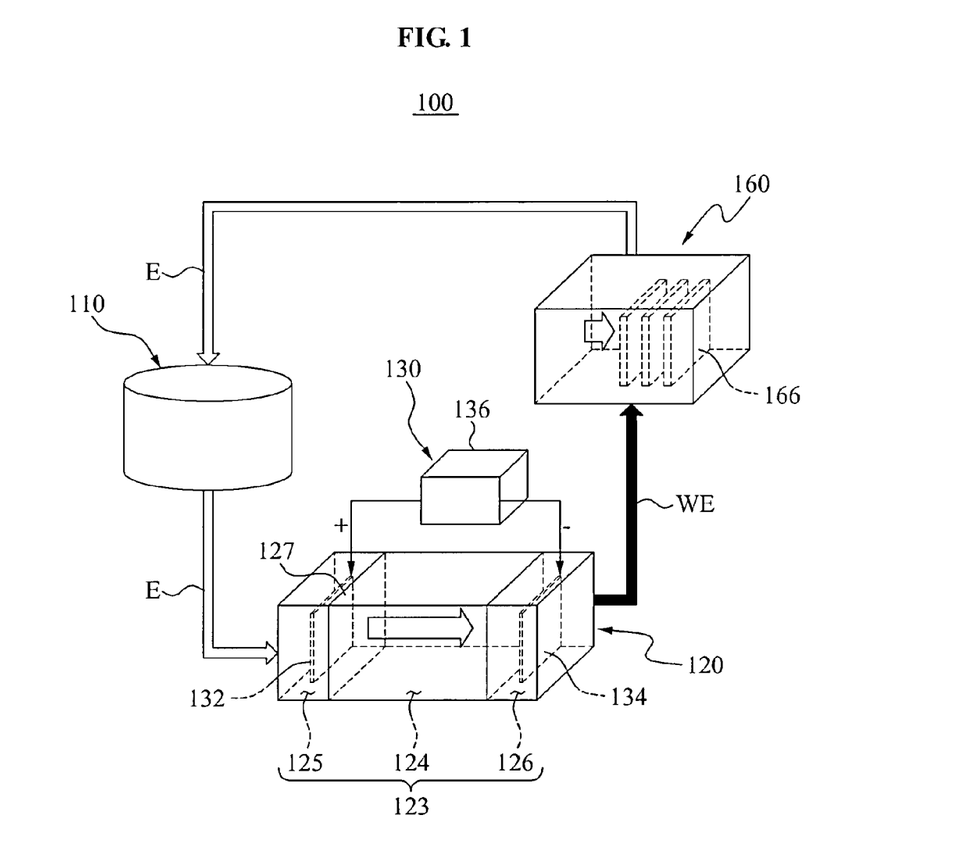
FIG. 1 is a diagram illustrating a structure of a complex electrokinetic decontamination equipment according to an embodiment of the present invention.
Figure 2:
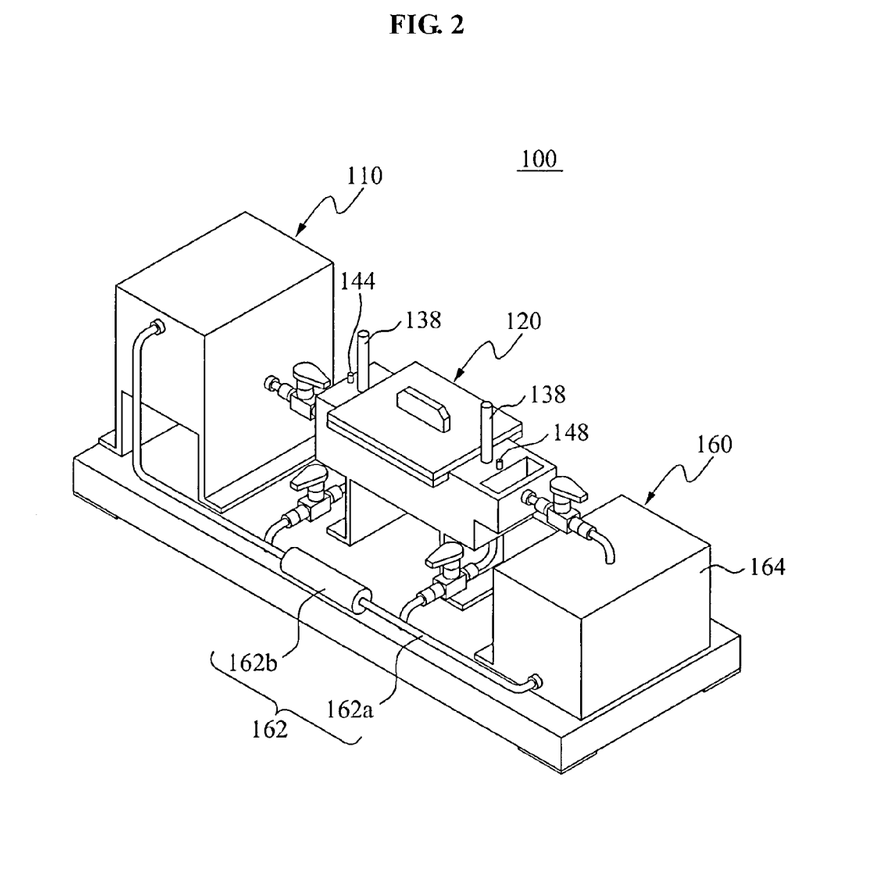
FIG. 2 is a perspective view illustrating main elements of the complex electrokinetic decontamination equipment shown in FIG. 1.
Figure 3:
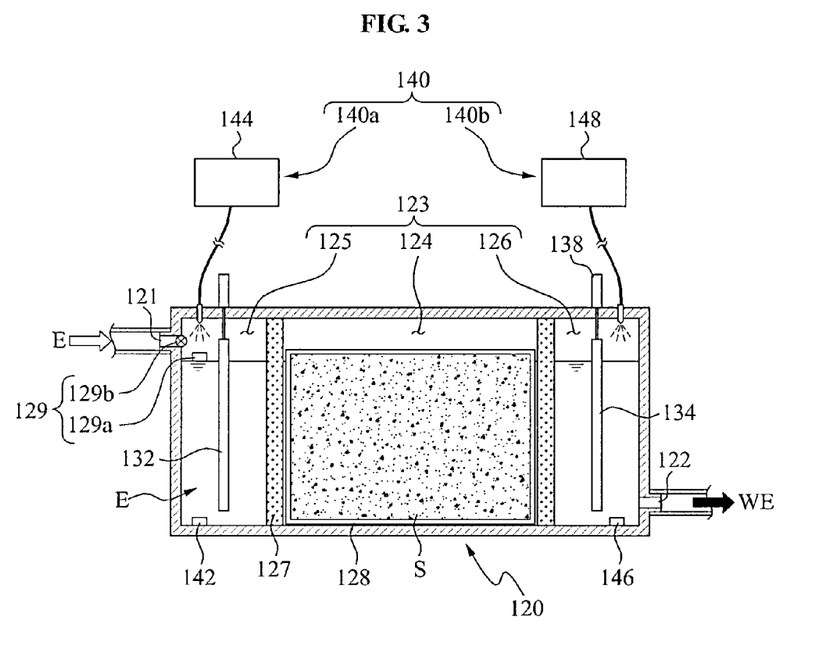
FIG. 3 is a sectional view illustrating an inside of an electrokinetic unit shown in FIG. 2.
Figure 4:
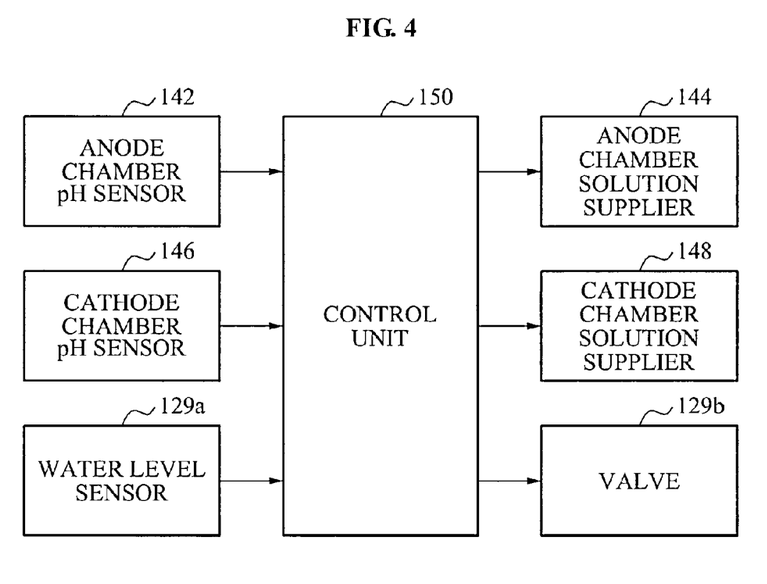
FIG. 4 is a block diagram illustrating a control structure of the complex electrokinetic decontamination equipment of FIG. 1.

FIG. 1 is a diagram illustrating a structure of a complex electrokinetic decontamination equipment 100 according to an embodiment of the present invention. FIG. 2 is a perspective view illustrating main elements of the complex electrokinetic decontamination equipment 100 shown in FIG. 1. FIG. 3 is a sectional view illustrating an inside of an electrokinetic unit 120 shown in FIG. 2. FIG. 4 is a block diagram illustrating a control structure of the complex electrokinetic decontamination equipment 100.

Referring to FIGS. 1 to 4, the complex electrokinetic decontamination equipment 100 includes an electrolyte supply unit 110, an electrokinetic unit 120, an electrode unit 130, a pH control unit 140, and a control unit 150.

The electrolyte supply unit 110 is adapted to supply an electrolyte E to the electrokinetic unit 120. The electrolyte E may serve as a medium of an electric current and also wash contaminated soil S which is contaminated by a radionuclide. Hereinafter, the electrolyte E will be described as nitric acid of about 0.6 to 1.0 molar although not specifically limited. That is, various types of the electrolyte E may be applied according to design and conditions of the complex electrokinetic decontamination equipment 100.

Referring to FIGS. 1 to 4, the electrokinetic unit 120 may perform washing decontamination of the contaminated soil S using the electrolyte E and electrokinetic decontamination of the contaminated soil S using the electrode unit 130, simultaneously.

An inlet 121 through which the electrolyte E flows in may be provided at one side of the electrokinetic unit 120. An outlet 122 may be provided at another side of the electrokinetic unit 120. Through the outlet 122, waste electrolytes (WE) used for decontamination by the electrokinetic unit 120 may be discharged. The inlet 121 may fluidly communicate with the electrolyte supply unit 110. The electrolyte E in the electrolyte supply unit 110 may flow into the electrokinetic unit 120 through the inlet 121. The waste electrolyte WE in the electrokinetic unit 120 may be discharged to the outside through the outlet 122.

The electrokinetic unit 120 may include a receiving portion 123 adapted to receive the contaminated soil S. The contaminated soil S may be received in the receiving portion 123 in a state of being packed by a packing member 128 of a mesh type. The packing member 128 of mesh type may allow passage of the electrolyte E, while preventing passage of soil. For example, the packing member 128 may be made of an unwoven fabric.

The receiving portion 123 may be sectioned into a receiving chamber 124 for receiving the contaminated soil S, an anode chamber 125 disposed between the receiving chamber 124 and the inlet 121, and a cathode chamber 126 disposed between the receiving chamber 124 and the outlet 122. A partition 127 may be provided in the receiving chamber 123 to section an inner space of the electrokinetic unit 120 into the receiving chamber 124, the anode chamber 125, and the cathode chamber 126. The partition 127 may be structured to allow passage of the electrolyte E.

The electrolyte supply unit 110 may be disposed at a higher position than the inlet of the electrokinetic unit 120. Accordingly, the electrolyte E in the electrolyte supply unit 110 may be automatically supplied to the receiving portion 123 of the electrokinetic unit 120 due to a head difference of the electrolyte E. Therefore, a pump for forcing the electrolyte E from the electrolyte supply unit 110 to the electrokinetic unit 120 may be omitted.

An electrolyte supply controller 129 may be provided in the electrokinetic unit 120 to control quantity of the electrolyte E supplied from the electrolyte supply unit 110. That is, the electrolyte supply controller 129 may automatically control a quantity of the electrolyte E supplied, according to a water level of the electrolyte E received in the receiving portion 123. Accordingly, a constant water level of the electrolyte E may be maintained.

The electrolyte supply controller 129 may include a water level sensor 129a and a valve 129b. The water level sensor 129a may be disposed in the electrokinetic unit 120 to detect a water level of the electrolyte E received in the receiving portion 123. The valve 129b may be configured to be openable and disposed at the inlet 121 to selectively open and close the inlet 121 according to a detection value of the water level sensor 129a.

For example, the water level sensor 129a may be a floating sensor disposed at a water surface of the electrolyte E. The valve 129b may be a solenoid valve electronically controlled by the control unit 150 according to the detection value of the floating sensor. However, the structure of the electrolyte supply controller 129 is not specifically defined but may include various types of sensors, valves, and the like according to design and conditions of the complex electrokinetic decontamination equipment 100.

Referring to FIGS. 1 to 3, the electrode unit 130 may perform electrokinetic decontamination of the contaminated soil S, by providing an anode power and a cathode power to different portions of the contaminated soil S received in the receiving portion 123 of the electrokinetic unit 120. The electrode unit 130 may be provided to the electrokinetic unit 120.

For example, the electrode unit 130 may include an anode electrode 132 disposed in the anode chamber 125, a cathode electrode 134 disposed in the cathode chamber 126, and a power supply 136 for supplying the anode power and the cathode power to the anode electrode 132 and the cathode electrode 134, respectively. The anode electrode 132 and the cathode electrode 134 may be submerged in the electrolyte E in the anode chamber 125 and the cathode chamber 126. The power supplier 136 may be disposed at an outside of the electrokinetic unit 120.

Therefore, according to the present invention, a power supply terminal 138 that transmits power from the power supplier 136 to the anode electrode 132 and the cathode electrode 134 is configured to pass through the electrokinetic unit 120. That is, the anode power of the power supplier 136 may be supplied to the anode electrode 132 through the power supply terminal 138. The cathode power of the power supplier 136 may be supplied to the cathode electrode 134 through the power supply terminal 138. However, the foregoing configuration may be altered according to design and conditions of the complex electrokinetic decontamination equipment 100.

Referring to FIGS. 1 to 4, the pH control unit 140 controls pH values of the portions supplied with the anode power and the cathode power of the electrokinetic unit 120. The pH control unit 140 may be provided to the electrokinetic unit 120 and configured to supply a pH control solution to the portions supplied with the anode power and the cathode power. The pH control unit 140 may supply the pH control solution to the anode chamber 125 and the cathode chamber 126 to control the pH values in the anode chamber 125 and the cathode chamber 126 to preset values.

For example, the pH control unit 140 may include an anode pH controller 140a for controlling a pH value in the anode chamber 125 to a first preset value by supplying the pH control solution to the anode chamber 125, and a cathode pH controller 140b for controlling a pH value in the cathode chamber 126 to a second preset value by supplying the pH control solution to the cathode chamber 126.

The anode pH controller 140a may include an anode chamber pH sensor 142 disposed in the anode chamber 125, and an anode chamber solution supplier 144 for supplying the pH control solution into the anode chamber 125 according to a detection value of the anode chamber pH sensor 142. The cathode pH controller 140b may include a cathode chamber pH sensor 146 disposed in the cathode chamber 126, and a cathode chamber solution supplier 148 for supplying the pH control solution into the cathode chamber 126 according to a detection value of the cathode chamber pH sensor 146. Thus, the pH values in the anode chamber 125 and the cathode chamber 126 may be controlled by the anode pH controller 140a and the cathode pH controller 140b, respectively.

Here, the first preset value and the second preset value may be within a range of about 0.5 pH to 1.5 pH. In this case, metal oxide particles generated from the cathode chamber 126 may be reduced in quantity. However, the first preset value and the second preset value may be varied according to a state of the contaminated soil S.

The pH control solution may be a nitric acid solution. When the pH control solution is the same nitric acid solution as the electrolyte E, unwanted chemical reaction may not occur even when the pH control solution and the electrolyte E are mixed in the electrokinetic unit 120. Furthermore, the pH control solution flowing into the electrokinetic unit 120 may be used as the electrolyte E. That is, since only the nitric acid solution is used, design conditions of the complex electrokinetic decontamination equipment 100 may be simplified.

Alternatively, the pH control unit 140 may include an anode chamber pH sensor 142 disposed in the anode chamber 125, a cathode chamber pH sensor 146 disposed in the cathode chamber 126, and a solution supplier for supplying the pH control solution to at least one of the anode chamber 125 and the cathode chamber 126 according to detection values of the anode chamber pH sensor 142 and the cathode chamber pH sensor 146. That is, the pH values of the anode chamber 125 and the cathode chamber 126 may be selectively controlled by a single solution supplier.

Hereinafter, the present embodiment will be described with respect to a case in which the pH control unit 140 includes the anode pH controller 140a and the cathode pH controller 140b, however it is not limited thereto. That is, the configuration may be altered according to the design and conditions of the complex electrokinetic decontamination equipment 100.

Referring to FIGS. 2 to 4, the control unit 150 controls the operation of the complex electrokinetic decontamination equipment 100. In particular, the control unit 150 controls the operations of the pH control unit 140 and the electrolyte supply controller 129.

To be more specific, the control unit 150 may control the operation of the anode pH controller 140a and the cathode pH controller 140b according to the detection values transmitted from the anode chamber pH sensor 142 and the cathode chamber pH sensor 146. In addition, the control unit 150 may control the operation of the valve 129b according to the detection value transmitted from the water level sensor 129a.

Numbers of the electrokinetic unit 120 and the electrode unit 130 may be increased as a quantity of the contaminated soil S to be processed increases. Although the electrokinetic unit 120 and the electrode unit 130 may be manufactured to have a large capacity, an increase in the capacity is limited. Therefore, the numbers of the electrokinetic unit 120 and the electrode unit 130 may be increased in order to increase the capacity of the complex electrokinetic decontamination equipment 100. Practically, the capacities of the electrokinetic unit 120 and the electrode unit 130 may be increased up to about 520 liters (L) and, in this case, about 50 drums of soil may be processed annually.

When pluralities of the electrokinetic unit 120 and the electrode unit 130 are provided, at least one of the electrolyte supply unit 110 and the pH control unit 140 may be connected to the electrokinetic unit 120 in parallel. Therefore, numbers of the electrolyte supply unit 110 and the pH control unit 140 do not have to be increased in proportion to the increased numbers of the electrokinetic unit 120 and the electrode unit 130. That is, an increase of the processing capacity of the complex electrokinetic decontamination equipment 100 may be achieved with ease.

Referring to FIGS. 1 to 3, the complex electrokinetic decontamination equipment 100 may further include a waste solution processing unit 160. The waste solution processing unit 160 may be adapted to remove the metal oxide particles by processing the waste electrolyte WE discharged through the outlet 122. The waste solution processing unit 160 may fluidly communicate with the outlet 122 of the electrokinetic unit 120. As the waste solution processing unit 160 processes the waste electrolyte WE discharged from the electrokinetic unit 120, quantity of the waste solution discharged out of the complex electrokinetic decontamination equipment 100 may be reduced.

For example, the waste solution processing unit 160 may include a waste solution circulator 162 and a metal oxide separator 164. The waste solution circulator 162 may be disposed between the outlet 122 and the electrolyte supply unit 110 to circulate the waste electrolyte WE being discharged through the outlet 122 to the electrolyte supply unit 110. The metal oxide separator 164 may be connected in fluid communication with the waste solution circulator 162 to remove the metal oxide particles from the waste electrolyte WE being circulated by the waste solution circulator 162. The metal oxide separator 164 may filter the metal oxide particles in a pressure filter method.

The metal oxide separator 164 may remove the metal oxide particles from the waste electrolyte WE circulating through the waste solution circulator 162 and recycle the waste electrolyte WE into the electrolyte E. In addition, the waste solution circulator 162 may supply the electrolyte supply unit 110 with the electrolyte E recycled from the waste electrolyte WE in a circulating manner, so that the electrolyte E is reused repeatedly. That is, since the complex electrokinetic decontamination equipment 100 is structured to recycle all the waste electrolyte WE discharged from the electrokinetic unit 120, no waste electrolyte may be discharged out from the complex electrokinetic decontamination equipment 100.

For example, the waste solution circulator 162 may include a circulation path 162a connected in fluid communication with the electrolyte supply unit 110, and a circulation pump 162b disposed on the circulation path 162a. The metal oxide separator 164 may include a filter member 166 for filtering the metal oxide particles from the waste electrolyte E. The filter member 166 may be detachably mounted in the metal oxide separator 164. Therefore, the filter member 166 may be replaced after being used for a predetermined time. The filter member 166 separated from the metal oxide separator 164 may be processed along with radioactive waste.

Hereinafter, a complex electrokinetic decontamination method using the above-structured complex electrokinetic decontamination equipment 100 will be described.

First, the contaminated soil S that is contaminated by a radionuclide is received in the receiving portion 123 of the electrokinetic unit 120. The electrolyte supply unit 110 is charged with the electrolyte E for decontaminating the contaminated soil S. Here, the contaminated soil S may be disposed in the receiving chamber 124 of the receiving portion 123 in a state of being packed by the packing member 128.

When the complex electrokinetic decontamination equipment 100 is driven, the electrolyte E is automatically supplied into the electrokinetic unit 120 by the head difference between the electrolyte supply unit 110 and the electrokinetic unit 120. That is, the electrolyte E in the electrolyte supply unit 110 may flow into the electrokinetic unit 120 through the inlet 121 and then flow to the outlet 122 along the receiving portion 123 of the electrokinetic unit 120. During this, the radionuclide included in the contaminated soil S may be washed by the electrolyte E in the electrokinetic unit 120.

The water level of the electrolyte E in the electrokinetic unit 120 may be automatically maintained by the electrolyte supply controller 129. That is, the electrolyte supply controller 129 may properly control opening and closing operation of the valve 129b, using the detection value of the water level sensor 129a. Therefore, the electrolyte E may be maintained at an optimal water level without separately checking the water level. Also, any trouble caused by shortage of the electrolyte E may be prevented.

Next, the power supplier 136 of the electrode unit 130 may supply the anode power and the cathode power to the anode electrode 132 and the cathode power 134, respectively, through the power supply terminal 138. Accordingly, the radionuclide in the contaminated soil S may be electrokinetic-decontaminated by a potential difference between the anode electrode 132 and the cathode electrode 134. Here, ferrum (Fe), magnesium (Mg), aluminum (Al), and the like may be discharged in the form of the metal oxide particles from the cathode chamber 126.

The complex electrokinetic decontamination equipment 100 may remove the radionuclide from the contaminated soil S by the electrolyte E supplied by the electrolyte supply unit 110 in a washing decontamination method. Simultaneously, the radionuclide of the contaminated soil S may be removed in an electrokinetic decontamination method by the anode power and the cathode power supplied by the electrode unit 130. That is, cesium (Cs), uranium (Ur), and cobalt (Co) may be removed from the contaminated soil S by the washing decontamination and the electrokinetic decontamination performed by the complex electrokinetic decontamination equipment 100.

Thus, the decontamination efficiency for the contaminated soil S contaminated by the radionuclide may be increased by combination of the washing decontamination method and the electrokinetic decontamination method. Furthermore, decontamination time may be reduced. Here, the waste solution generated during decontamination of the contaminated soil S may be processed by the waste solution processing unit 160.

The metal oxide particles generated from the cathode chamber 126 may disturb flow of the electrolyte E during the decontamination or cause heat in the electrokinetic unit 120.

Such a phenomenon becomes serious as the metal oxide particles are large in size and quantity. Therefore, the size and quantity of the metal oxide particles may be reduced by properly controlling the pH values in the anode chamber 125 and the cathode chamber 126 by the pH control unit 140.

That is, the anode pH controller 140a may control the quantity of the pH control solution supplied by the anode chamber solution supplier 144 according to the pH value in the anode chamber 125 detected by the anode chamber pH sensor 142. The cathode pH controller 140b may control the quantity of the pH control solution supplied by the cathode chamber solution supplier 148 according to the pH value in the cathode chamber 126 detected by the cathode chamber pH sensor 146. Thus, the pH values in the anode chamber 125 and the cathode chamber 126 may be controlled by the pH control solution including nitric acid solution.

The pH values in the anode chamber 125 and the cathode chamber 126 may be within a range of about 0.5 pH to 1.5 pH. When the pH values are controlled in the foregoing manner, the quantity and the size of the metal oxide particles generated from the cathode chamber 126 may be reduced.

The metal oxide particles generated in the cathode chamber 126 may be discharged out of the electrokinetic unit 120 through the inlet 122 along with the waste electrolyte WE. The waste electrolyte WE discharged out of the electrokinetic unit 120 may be processed by the waste solution processing unit 160 and reused.

That is, the metal oxide separator 164 of the waste solution processing unit 160 may remove the metal oxide particles from the waste electrolyte WE, thereby recycling the waste electrolyte WE into the electrolyte E. In addition, the waste solution circulator 162 of the waste solution processing unit 160 may guide the recycled electrolyte E into the electrolyte supply unit 110 to circulate the recycled electrolyte E. As described in the foregoing, while the waste electrolyte WE is being circulated to the electrolyte supply unit 110 by the waste solution circulator 162, the metal oxide particles may be removed by the metal oxide separator 164.

The electrolyte E recycled by the waste solution processing unit 160 may be collected to the electrolyte supply unit 110 and resupplied to the electrokinetic unit 120 by the electrolyte supply unit 110.

As aforementioned, since the waste solution generated during the decontamination is processed by the waste solution processing unit 160 and reused, almost no waste solution remains after the operation of the complex electrokinetic decontamination equipment 100.

Figure 5:
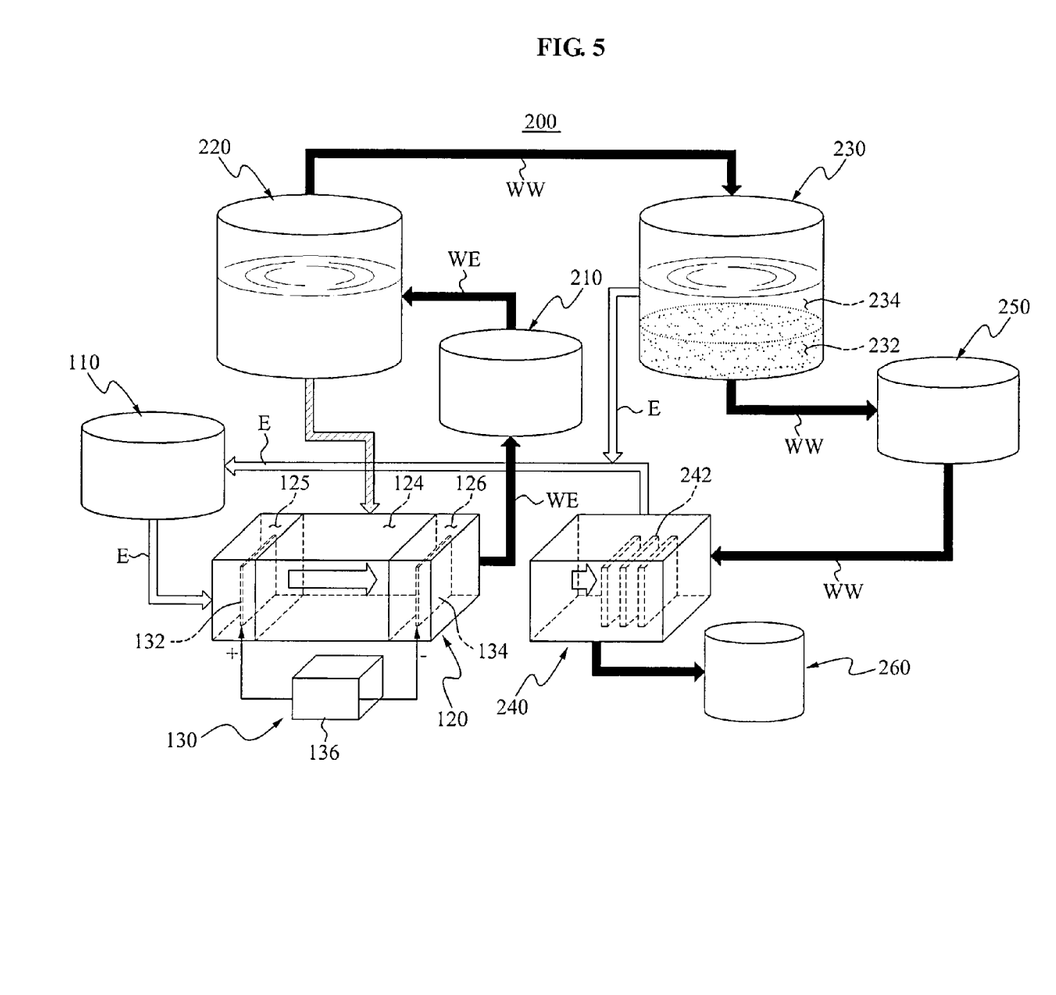
FIG. 5 is a diagram illustrating a structure of a complex electrokinetic decontamination equipment according to another embodiment of the present invention.
Figure 6:
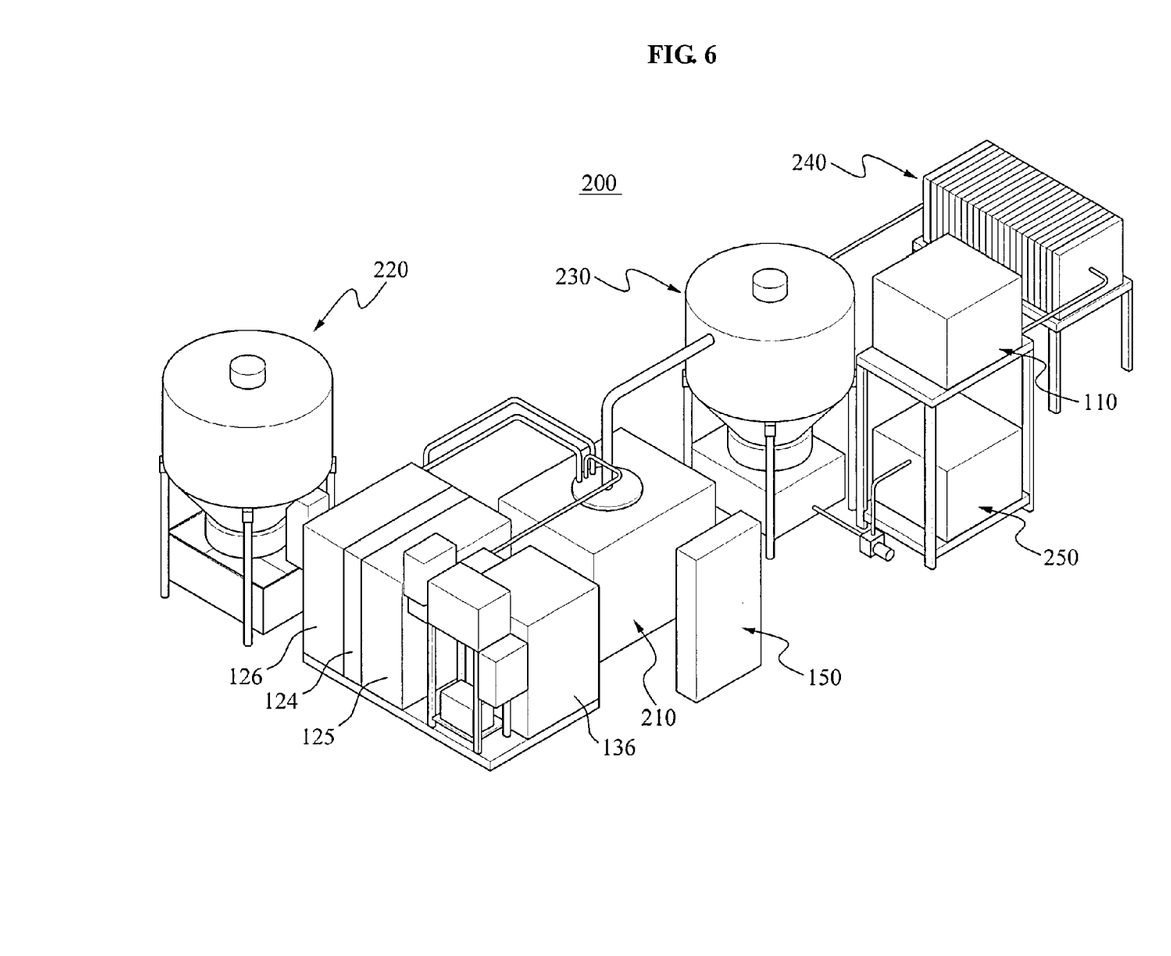
FIG. 6 is a perspective view of the complex electrokinetic decontamination equipment shown in FIG. 5.

FIG. 5 is a diagram illustrating a structure of a complex electrokinetic decontamination equipment 200 according to another embodiment of the present invention. FIG. 6 is a perspective view of the complex electrokinetic decontamination equipment shown in FIG. 5.

Like reference numerals in FIGS. 5 and 6 refer to like elements as in FIGS. 1 to 4. Hereinafter, differences from the complex electrokinetic decontamination equipment 100 illustrated in FIGS. 1 to 4 will be mainly described.

Referring to FIGS. 5 and 6, different from the complex electrokinetic decontamination equipment 100, the complex electrokinetic decontamination equipment 200 according to another embodiment is configured to perform pre-processing of contaminated soil supplied to the electrokinetic unit 120 and process and reuse the waste electrolyte WE discharged from the electrokinetic unit 120.

The complex electrokinetic decontamination equipment 200 may include an electrolyte 110, an electrokinetic unit 120, an electrode unit 130, a pH control unit 140, a control unit 150, a waste solution storage unit 210, a soil washing unit 220, a settling separation unit 230, and a waste solution processing unit 240.

The electrolyte supply unit 110, the electrokinetic unit 120, the electrode unit 130, the pH control unit 140, and the control unit 150 of the present embodiment may be configured in the same or a manner similar to the electrolyte supply unit 110, the electrokinetic unit 120, the electrode unit 130, the pH control unit 140, and the control unit 150 illustrated in FIGS. 1 to 4. In the following, the electrolyte supply unit 110, the electrokinetic unit 120, the electrode unit 130, the pH control unit 140, and the control unit 150 will not be described in detail and may be cited by the same reference numerals as in FIGS. 1 to 4.

The waste solution storage unit 210 may temporarily store waste electrolyte WE discharged through an outlet 122. The waste solution storage unit 210 may be connected in fluid communication with the outlet 122 of the electrokinetic unit 120.

The soil washing unit 220 may process the contaminated soil S to be supplied to the electrokinetic unit 120 in advance, thereby reducing content of a radionuclide included in the contaminated soil S. The soil washing unit 220 may wash the contaminated soil S using the waste electrolyte WE in the waste solution storage unit 210 or using nitride acid having concentration of about 1 to 2 mole in addition to the waste electrolyte WE. For this purpose, the soil washing unit 220 may fluidly communicate with the waste solution storage unit 210, however is not limited thereto. That is, the soil washing unit 220 may pre-process the contaminated soil S in various methods according to design and conditions.

When the soil washing unit 220 is used in the foregoing manner, the waste electrolyte WE discharged from the electrokinetic unit 120 may be used once more for washing of the contaminated soil S. Accordingly, utility of the electrolyte E may be improved. Furthermore, since the contaminated soil S is pre-processed by the soil washing unit 220, the decontamination efficiency of the complex electrokinetic decontamination equipment 200 may be further increased while reducing a decontamination load at the electrokinetic unit 120. In addition, the soil washing unit 220 may agitate, rotate, or oscillate to increase washing efficiency for the contaminated soil S.

Actually, about 80% to 85% of the radionuclide in the contaminated soil S may be removed during the pre-processing performed by the soil washing unit 220. Furthermore, about 95%, or more, of the radionuclide remaining in the pre-processed contaminated soil S may be removed by decontamination operation of the electrokinetic unit 120 and the electrode unit 130. Furthermore, the soil washing unit 220 may be manufactured in a large capacity of about 3,000 L. In this case, washing may be performed twice with a mixture of soil (kg) and wash solution (L) in the mixture ratio of 1:2.5.

A centrifuge may be further provided between the soil washing unit 220 and the electrokinetic unit 120. The centrifuge may centrifugally separate the soil washed by the soil washing unit 220, thereby removing the waste solution from the soil. As a result, sludge of the waste solution generated in the electrokinetic unit 120 may be minimized.

The settling separation unit 230 may separate the waste wash solution WW discharged from the soil washing unit 220 into a precipitate 232 and a supernatant 234, using a settling method. The settling separation unit 230 may fluidly communicate with the soil washing unit 220.

The precipitate 232 may include particle materials such as metal oxide particles or soil particles. The supernatant 234 may be electrolyte E separated from the particle materials. The supernatant 234 may be supplied again to the electrolyte supply unit 110. Therefore, the settling separation unit 230 may fluidly communicate with the electrolyte supply unit 110. However, the settling separation unit 230 may not directly supply the supernatant 234 to the electrolyte supply unit 110 but collect the supernatant 234 in a dedicated container before the supplying.

The waste solution processing unit 240 may process the waste wash solution WW including the precipitate 232, sent from the settling separation unit 230. That is, the waste solution processing unit 240 may process the waste wash solution WW including a large quantity of the precipitate 232. For this, the waste solution processing unit 240 may fluidly communicate with the settling separation unit 230 to be supplied with the waste wash solution WW from the settling separation unit 230.

In addition, the waste solution processing unit 240 may be configured to filter the particle materials such as the metal oxide particles. That is, the waste solution processing unit 240 may include a filter member 242 for filtering the precipitate 232 from the waste wash solution WW. The filter member 242 may be structured in the same or similar manner as the filter member 166 of the waste solution processing unit 160 shown in FIG. 1.

As aforementioned, the waste solution processing unit 240 may separate the waste wash solution WW supplied from the settling separation unit 230 into the electrolyte E and the precipitate 232. Thus-recycled electrolyte E may be collected into the electrolyte supply unit 110. Therefore, the waste solution processing unit 240 may fluidly communicates with the electrolyte supply unit 110.

A concentration unit 250 for concentrating the waste wash solution WW discharged from the settling separation unit 230 may be disposed between the settling separation unit 230 and the waste solution processing unit 240. Therefore, a quantity of the waste wash solution WW to be processed by the waste solution processing unit 240 may be reduced.

In addition, the filter member 242 of the waste solution processing unit 240 may be detachable. Therefore, the filter member 242 may be replaced after use for a predetermined time. The filter member 242 may be dried by a drying unit 260 and then processed along with radioactive waste.

As described in the foregoing, the complex electrokinetic decontamination equipment 200 according to another embodiment of the present invention may perform pre-processing for washing the contaminated soil S using the waste electrolyte WE discharged from the electrokinetic unit 120. In addition, the waste wash solution WW used for the pre-processing is double processed by settling and filtering performed by the settling separation unit 230 and the waste solution processing unit 240, thereby being recycled into the electrolyte E.

The complex electrokinetic decontamination equipment 200 according to another embodiment may apply different processing methods according to concentration of the radionuclide in the soil. For example, soil with a high radionuclide concentration may be processed by combined use of the soil washing unit 220, the electrokinetic unit 120, the settling separation unit 230, and the waste solution processing unit 240. Meanwhile, soil with a low radionuclide concentration may be processed by only the soil washing unit 220, the settling separation unit 230, and the waste solution processing unit 240.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An electrokinetic decontamination equipment for removing a radionuclide from contaminated soil, the apparatus comprising:
    an electrolyte supply unit to supply electrolyte;
    an electrokinetic unit comprising an inlet disposed at a first side and connected with the electrolyte supply unit for supplying the electrolyte from the electrolyte supply unit to the electrokinetic unit, a receiving portion disposed inside the electrokinetic unit to receive the contaminated soil, and an outlet disposed at a second side to discharge from the electrokinetic unit waste electrolyte passed through the contaminated soil;
    an electrode unit operably provided to the electrokinetic unit to supply an anode power and a cathode power to different portions of the contaminated soil received in the receiving portion;
    a pH control unit operably provided to the electrokinetic unit to supply a pH control solution to each different portion supplied with the anode power and the cathode power so as to control pH values of the different portions;
    a waste solution storage unit connected to the outlet of the electrokinetic unit to store the waste electrolyte discharged through the outlet;
    a soil washing unit connected to the waste solution storage unit adapted to reduce by 70-80% a content of the radionuclide in the contaminated soil supplied to the electrokinetic unit, the soil washing unit adapted to use the waste electrolyte supplied from the waste solution storage unit;
    a settling separation unit connected to the soil washing unit to separate waste wash solution discharged from the soil washing unit into precipitate and supernatant; and
    a waste solution processing unit connected to the settling separation unit to process the precipitate separated by the settling separation unit,
    wherein 70-80% of the radionuclide is removed from the contaminated soil by the waste electrolyte in the washing unit and wherein the electrode unit and the electrolyte in the electrokinetic unit are adapted to remove about 95% or more of the radionuclide remaining in the contaminated soil from the washing unit,
    and wherein the receiving portion further comprises a packing member configured to allow passage of the electrolyte and to prevent passage of the soil,
    wherein the apparatus further comprises a centrifuge between the soil washing unit and the electrokinetic unit adapted to separate the soil washed by the soil washing unit.

2. The electrokinetic decontamination equipment of claim 1, wherein the pH control unit comprises:
    an anode pH controller to control a pH value of a portion supplied with the anode power to a first preset value by supplying the pH control solution to the portion supplied with the anode power; and
    a cathode pH controller to control a pH value of a portion supplied with the cathode power to a second preset value by supplying the pH control solution to the portion supplied with the cathode power.

3. The electrokinetic decontamination equipment of claim 2, wherein the first preset value and the second preset value are within a range of 0.5 pH to 1.5 pH.

4. The electrokinetic decontamination equipment of claim 2, wherein the pH control solution is a nitric acid solution.

5. The electrokinetic decontamination equipment of claim 1, wherein
the receiving portion of the electrokinetic unit comprises:
a receiving chamber configured to receive the contaminated soil;
an anode chamber disposed between the receiving chamber and the inlet; and
a cathode chamber disposed between the receiving chamber and the outlet, and
the electrode unit comprises:
an anode electrode disposed in the anode chamber;
a cathode electrode disposed in the cathode chamber; and
a power supply to supply the anode power and the cathode power to the anode electrode and the cathode electrode, respectively.

6. The electrokinetic decontamination equipment of claim 5, wherein the pH control unit comprises:
an anode pH controller to control a pH value in the anode chamber to a first preset value by supplying the pH control solution to the anode chamber; and
a cathode pH controller to control a pH value in the cathode chamber to a second preset value by supplying the pH control solution to the cathode chamber.

7. The electrokinetic decontamination equipment of claim 6, wherein
the anode pH controller comprises:
an anode chamber pH sensor disposed in the anode chamber; and
an anode chamber solution supplier to supply the pH control solution into the anode chamber according to a detection value of the anode chamber pH sensor, and
the cathode pH controller comprises:
a cathode chamber pH sensor disposed in the cathode chamber; and
a cathode chamber solution supplier to supply the pH control solution into the cathode chamber according to a detection value of the cathode chamber pH sensor.

8. The electrokinetic decontamination equipment of claim 5, wherein the pH control unit comprises:
an anode chamber pH sensor disposed in the anode chamber;
a cathode chamber pH sensor disposed in the cathode chamber; and
a solution supplier to supply the pH control solution to at least one of the anode chamber and the cathode chamber according to detection values of the anode chamber pH sensor and the cathode chamber pH sensor.

9. The electrokinetic decontamination equipment of claim 1, wherein the waste solution processing unit removes metal oxide particles included in the precipitate separated by the settling separation unit.

10. The electrokinetic decontamination equipment of claim 9, wherein the waste solution processing unit comprises:
a waste solution circulator disposed between the outlet of the electrokinetic unit and the electrolyte supply unit to circulate the waste solution being discharged through the outlet to the electrolyte supply unit; and
a metal oxide separator connected in fluid communication with the waste solution circulator to remove the metal oxide particles from the waste solution being circulated by the waste solution circulator.

11. The electrokinetic decontamination equipment of claim 10, wherein
the receiving portion of the electrokinetic unit comprises:
a receiving chamber configured to receive the contaminated soil;
an anode chamber disposed between the receiving chamber and the inlet; and
a cathode chamber disposed between the receiving chamber and the outlet,
the electrode unit comprises:
an anode electrode disposed in the anode chamber;
a cathode electrode disposed in the cathode chamber; and
a power supply to supply the anode power and the cathode power to the anode electrode and the cathode electrode, respectively, and
the waste solution circulator comprises:
a circulation path connected in fluid communication with the cathode chamber and the electrolyte supply unit; and
a circulation pump disposed on the circulation path.

12. The electrokinetic decontamination equipment of claim 10, wherein the metal oxide separator comprises a detachable filter member to filter the metal oxide particles from the waste electrolyte.

13. The electrokinetic decontamination equipment of claim 1, wherein
the waste electrolyte and the waste wash solution comprises metal oxide particles generated around the cathode power in the electrokinetic unit,
the precipitate comprises the metal oxide particles settling at a lower portion of the settling separation unit,
the supernatant comprises the electrolyte separated from the metal oxide particles and disposed at an upper portion of the settling separation unit, and
the settling separation unit circulates the supernatant to the electrolyte supply unit while discharging the waste wash solution including the precipitate to the waste solution processing unit.

14. The electrokinetic decontamination equipment of claim 13, further comprising a concentration unit disposed between the settling separation unit and the waste solution processing unit to concentrate the waste wash solution being discharged from the settling separation unit.

15. The electrokinetic decontamination equipment of claim 13, wherein
the waste solution processing unit comprises a detachable filter member to filter the metal oxide particles from the waste wash solution, and
the waste solution processing unit circulates, to the electrolyte supply unit, the electrolyte from which the metal oxide particles are separated by the filter member.

16. The electrokinetic decontamination equipment of claim 1, wherein
the electrolyte supply unit is disposed at a higher position than the inlet of the electrokinetic unit so that the electrolyte is automatically supplied to the receiving portion by a head difference of the electrolyte, and
the electrokinetic unit comprises an electrolyte supply controller to control a supplied quantity of the electrolyte so that a water level of the electrolyte in the receiving portion is maintained constantly.

17. The electrokinetic decontamination equipment of claim 16, wherein the electrolyte supply controller comprises:
a water level sensor disposed in the electrokinetic unit to detect the water level of the electrolyte in the receiving portion; and
a valve openably disposed at the inlet to selectively open or close the inlet according to a detection value of the water level sensor.

18. The electrokinetic decontamination equipment of claim 1, wherein
the electrokinetic unit and the electrode unit are plural in number, and
at least one of the electrolyte supply unit and the pH control unit is connected to the plurality of electrokinetic units in parallel.

19. An electrokinetic decontamination method comprising:
providing the electrokinetic decontamination equipment as claimed in claim 1;
washing contaminated soil to reduce radionuclide included in the contaminated soil;
separating the washed contaminated soil from the washing step by centrifuging;
putting the contaminated soil separated by the centrifuging step in an electrokinetic unit;
supplying an anode power and a cathode power to different portions of the contaminated soil in the electrokinetic unit to electrokinetic-decontaminate the contaminated soil;
supplying a pH control solution to the portions supplied with the anode power and the cathode power so as to control pH values of the portions; and
processing a waste solution generated during the electrokinetic decontamination of the contaminated soil,
wherein 70-80% of the radionuclide is removed from the contaminated soil by the washing step and about 95% or more of the radionuclide remaining in the contaminated soil from the washing unit is removed in the electrokinetic unit,
and wherein the receiving portion further comprises a packing member configured to allow passage of the electrolyte and to prevent passage of the soil.

20. The electrokinetic decontamination equipment of claim 1 further comprising two partitions in the receiving chamber separating the receiving chamber from the anode chamber and from the cathode chamber, and structured to allow passage of the electrolyte through the partitions.

* * * * *